US011513298B2

(12) United States Patent
Leeson et al.

(10) Patent No.: US 11,513,298 B2
(45) Date of Patent: Nov. 29, 2022

(54) PRECONNECTORIZED MULTI-FIBER DROP CABLES AND METHODS FOR DEPLOYING AND ASSEMBLING PRECONNECTORIZED MULTI-FIBER DROP CABLES

(71) Applicant: PPC BROADBAND FIBER LTD., Woodbridge (GB)

(72) Inventors: Kim Leeson, Ipswich (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 0 days.

(21) Appl. No.: 17/152,777

(22) Filed: Jan. 19, 2021

(65) Prior Publication Data

US 2021/0141169 A1    May 13, 2021

Related U.S. Application Data

(63) Continuation-in-part of application No. 16/412,170, filed on May 14, 2019, now Pat. No. 10,921,532, (Continued)

(51) Int. Cl.
*G02B 6/38* (2006.01)
*G02B 6/44* (2006.01)

(52) U.S. Cl.
CPC ......... *G02B 6/3898* (2013.01); *G02B 6/3821* (2013.01); *G02B 6/3849* (2013.01); *G02B 6/4465* (2013.01); *G02B 6/3879* (2013.01)

(58) Field of Classification Search
CPC ... G02B 6/3898; G02B 6/3821; G02B 6/3849
See application file for complete search history.

(56) References Cited

U.S. PATENT DOCUMENTS 4,684,161 A    8/1987 Egner et al.
4,684,211 A    8/1987 Weber et al.
(Continued)

FOREIGN PATENT DOCUMENTS

EP    2431776 A1    3/2012
GB    2485070 A    5/2012

OTHER PUBLICATIONS

Search Report dated Apr. 18, 2013 in corresponding United Kingdom Application No. GB1300214.2, 2 pages.

*Primary Examiner* — Sung H Pak
(74) *Attorney, Agent, or Firm* — MH2 Technology Law Group LLP

(57) ABSTRACT

An optical fiber connector sub-assembly for an optical fiber connector includes a ferrule configured to hold an optical fiber therein along an axis of the connector, a ferrule basket configured to hold the ferrule at a front portion of the connector, a retaining member having a front end portion configured to hold the ferrule holder and a rear end portion configured to receive a fiber optic cable, and a boot configured to be coupled with retaining member. The ferrule basket includes a base portion and a stem portion that extend rearward from the base portion. An outer periphery of the base portion includes two flat portions arranged at a right angle relative to one another, and first ends of the two flat portions that are nearest to one another along the outer periphery of the base portion are connected to one another by a curved bottom portion. Two side curved portions extend from second ends of the two flat portions that are furthest from one another along the outer periphery of the base portion, and top curved portion connects the two side curved portions.

18 Claims, 14 Drawing Sheets

Related U.S. Application Data which is a continuation of application No. 15/696,108, filed on Sep. 5, 2017, now Pat. No. 10,288,822, which is a continuation of application No. 15/047,133, filed on Feb. 18, 2016, now Pat. No. 9,753,234, which is a continuation of application No. 14/536,013, filed on Nov. 7, 2014, now Pat. No. 9,285,559.

(60) Provisional application No. 62/962,663, filed on Jan. 17, 2020.

(56) References Cited

U.S. PATENT DOCUMENTS

| | | |
|---|---|---|
| 5,863,083 A | 1/1999 | Giebel et al. |
| 5,923,804 A | 7/1999 | Rosson |
| 6,104,855 A | 8/2000 | Jeon |
| 6,234,683 B1 | 5/2001 | Waldron et al. |
| 6,389,214 B1 | 5/2002 | Smith et al. |
| 8,285,096 B2 | 10/2012 | Coleman et al. |
| 8,412,017 B2 | 4/2013 | Kowalczyk et al. |
| 8,620,129 B2 | 12/2013 | Rudenick et al. |
| 9,057,862 B2 | 6/2015 | Strasser et al. |
| 9,164,233 B2 | 10/2015 | Wouters |
| 9,285,559 B1 | 3/2016 | Stockton et al. |
| 9,297,976 B2 | 3/2016 | Hill et al. |
| 9,753,234 B2 | 9/2017 | Stockton et al. |
| 2008/0226234 A1 | 9/2008 | Droege |
| 2009/0238523 A1 | 9/2009 | Honma et al. |
| 2009/0238534 A1 | 9/2009 | Ahmed |
| 2010/0202748 A1 | 8/2010 | Pierce et al. |
| 2019/0101702 A1* | 4/2019 | Li .................... G02B 6/3834 |
| 2020/0124805 A1* | 4/2020 | Rosson .............. G02B 6/3897 |

\* cited by examiner

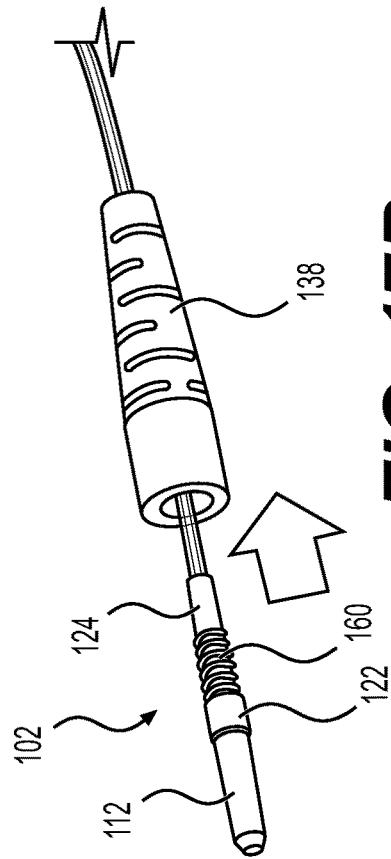
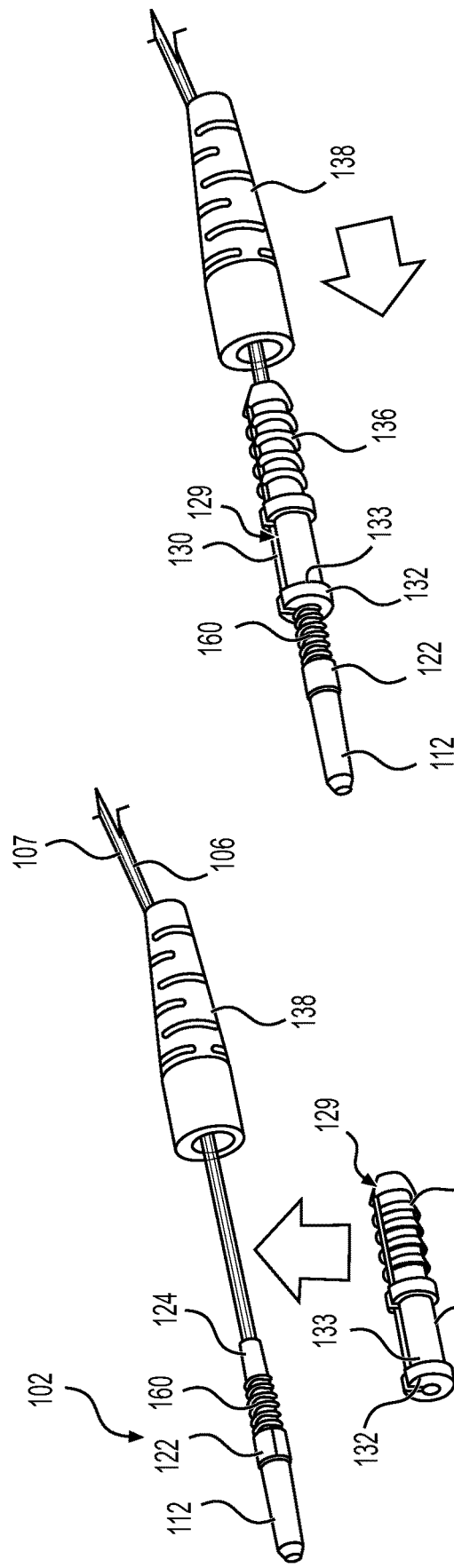
FIG. 17B
FIG. 17C
FIG. 17D

PRECONNECTORIZED MULTI-FIBER DROP CABLES AND METHODS FOR DEPLOYING AND ASSEMBLING PRECONNECTORIZED MULTI-FIBER DROP CABLES

CROSS REFERENCE TO RELATED APPLICATIONS

This application claims the benefit of U.S. Provisional Application No. 62/962,663, filed Jan. 17, 2020, the disclosure of which is hereby incorporated by reference herein in its entirety.

This application is also a continuation-in-part of U.S. patent application Ser. No. 16/412,170, filed May 14, 2019, pending, which is a continuation of U.S. patent application Ser. No. 15/696,108, filed Sep. 5, 2017, now U.S. Pat. No. 10,288,822, which is a continuation of U.S. patent application Ser. No. 15/047,133, filed Feb. 18, 2016, now U.S. Pat. No. 9,753,234, which is a continuation of U.S. patent application Ser. No. 14/536,013, filed Nov. 7, 2014, now U.S. Pat. No. 9,285,559. The disclosure of the prior applications is hereby incorporated by reference herein in its entirety.

BACKGROUND a. Field of the Invention

The present invention relates to the installation of an optical fiber cable in optical fiber ducting, which may be an optical fiber microduct, and in particular to the installation in ducting of optical fiber cabling carrying optical fibers terminated at one or more multiple optical fiber connectors.

The present disclosure relates to preconnectorized multi-fiber drop cables, for example, multi-fiber drop cables having fibers terminated with an LC (Lucent Connector) connector sub-assembly. More particularly, the disclosure relates to preconnectorized LC duo and LC quattro drop cables and methods for deploying the preconnectorized LC duo and LC quattro drop cables.

b. Related Art

Optical fiber connectors are used to join optical fibers where a connect/disconnect capability is required. The basic connector unit is a connector assembly at the end of a length of optical fiber cable, which will include a protective outer sheath around a coated optical fiber. The optical fiber will have an optical fiber core, and will often have a primary coating applied to the fiber during manufacture and a surrounding secondary polymer coating. Such a coated optical fiber is referred to as a buffered optical fiber. The buffering provides such functions as mechanical isolation, protection from physical damage and fiber identification for use during installation, but the buffered optical fiber is itself quite delicate where this is exposed for termination in a connector at the end of the protective outer sheath of the cable.

A dual connector assembly consists of two connector plugs. Due to the polishing and tuning procedures that may be incorporated into optical connector manufacturing, connectors are generally assembled onto optical fiber in a supplier's manufacturing facility. However, the assembly and polishing operations involved can be performed in the field.

SC optical fiber connectors and LC optical fiber connectors are the most common types of connectors on the market. In many data centre applications, small connectors (e.g., LC) and multi-fiber connectors (e.g., MTP) are replacing larger, older styles of connector (e.g., SC), allowing more fiber ports per unit of rack space.

Modern connectors typically use a "physical contact" polish on the fiber and ferrule end, which usually has a slightly curved, convex surface, so that when fibers are mated only the fiber cores touch, not the surrounding ferrules. Some manufacturers have several grades of polish quality, for example a regular FC connector may be designated "FC/PC" (for physical contact), while "FC/SPC" and "FC/UPC" may denote "super" and "ultra" polish qualities, respectively. Higher grades of polish give less insertion loss and lower back reflection. When a connector is terminated or assembled in the field, any damage to the polished ferrule and fiber of the connector can cause very high insertion loss.

Optical fiber cables are frequently routed in ducts. The ducts in which optical fiber cables are installed are usually made of cylindrical polyethylene tubing with a diameter ranging from typically 25 mm to 100 mm. Sometimes optical fiber cables are installed inside sub-ducts which are routed inside larger ducts, such as this type of polythene tubing or ducts formed in other materials, such as like concrete. Small sub-ducts are usually referred to as microducts and are often used to install small microduct fiber optic cables. Microducts have a size ranging from typically 3 mm to 16 mm and are may be installed as bundles inside larger ducts.

The invention described below is particularly applicable to the installation of multiple optical fiber cabling inside microducts inside microducts, for example duplex optical fiber cabling, where the internal diameter of the microduct may be less than the maximum width of the multiple optical fiber connector to be fitted at the terminated end of the cabling. In the context of the present invention, the term "duplex" is used to mean "dual", "two" or "twin" fibers or assemblies, rather than a single fiber used for bi-directional transmission. Similarly, the term "multiple" is used to mean "two or more".

As will become apparent, the invention may, however, also be useful when installing duplex or multiple optical fiber cabling inside larger ducts, and therefore the terms "duct" and "ducting" as used in relation to the invention apply both to microducts and to larger ducts for routing optical fiber cables without microducting.

One common form of optical fiber cable is the duplex optical fiber cable, with one fiber being used for transmitting (Tx) and the other fiber being used for receiving (Rx). For convenience, the duplex optical fibers are terminated within a duplex optical fiber connector unit having a joined pair of side-by-side connectors, each with a termination ferrule for terminating one of the optical fiber cores. The duplex optical fibers may be held within a cable having a single outer sheath or in a cable having a pair of joined outer sheaths. Multiple duplex pairs may also be provided within one cable, each duplex pair being for termination in one duplex connector. The invention is applicable to any such cable having at least one pair of optical fibers for termination in a duplex optical fiber connector, where the optical fiber cable is to be installed inside an optical fiber duct.

The installation of fiber optic cables in ducts can be done by pulling, in which a pre-installed thread or wire inside the duct is used to pull the connector end of an optical fiber cable down a length of the ducting. Usually, the cable being inserted into the near end of the duct is mechanically pushed at the same time. Alternatively, a technique called cable jetting (also called cable blowing), can be used, together with cable pushing. In cable jetting, high pressure air is blown down the duct and the flow of air pulls along the inserted cable until the cable exits the far end of the duct.

It is not common to install a terminated fiber cable into already occupied duct because of the danger of entanglement and damage. The space inside the duct is normally limited by the customer's desire to use the smallest possible duct. Installing a duplex connector in a duct would be more difficult than installing a simplex connector owing to the larger dimensions of the duplex connector at the end of the cable. Even in the case of the smaller LC optical fiber duplex connector, there may be inadequate clearance inside the duct for the duplex connector when pulling or jetting the cable down the length of ducting. There is also the problem that the duplex connector, or the terminated optical fiber ferrules within the connector, may have to be protected from damage or contamination during installation within the ducting, which may require additional protection to be fitted to or around the duplex connector, thereby potentially increasing the exterior dimensions of the connector and making it even more difficult, or impossible, to fit the duplex connector into the available space within the ducting.

The mechanical tolerances involved in terminating single mode optical fiber are much tighter than those for multimode optical fiber. Therefore, while it is quite common for multimode optical fiber to be terminated at the point of use, for example, at a user's premises or at an outside junction box, in most product applications, single mode optical fiber is not terminated in the field. When single mode fiber must be terminated in the field, then it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector that is configured to be connected with an outer housing after the pre-terminated end is deployed to its desired location. The pre-terminated end and housing is then ready to plug into a matching receptacle.

One example of such a connector is an LC connector. The LC connector and adapters were originally developed by Lucent Technologies. The LC connector is a miniaturized version of the fiber optic SC (Subscriber Connector) connector, thus being also known as a small form factor connector. The LC connector looks somewhat similar to the SC connector, but is about half the size with a 1.25 mm ferrule instead of a 2.5 mm ferrule. LC connectors are typically composed of a plastic housing with an RJ45 push-pull style clip.

Conventional optical fiber LC connectors comprise a rigid pushable structure to allow for limited movement of the connector parts while being pushed down stretches of a duct. However, some conventional fiber optic cables include more than one fiber. For example, some fiber optic cables include two, four, or more fibers.

Conventional optical fiber LC connectors and LC connector sub-assemblies are not necessarily designed to minimize a cross-sectional footprint and, therefore, it is difficult to push multiple preconnectorized fibers of a multi-fiber cable through a duct simultaneously.

It is an object of the invention to address these problems and to provide a more convenient apparatus and method for installing a multiple optical fiber connector when the optical fiber cable is to be routed in a duct for optical fiber cabling. For example, Therefore, it may be desirable to provide a preconnectorized multi-fiber drop cables having a minimal cross-sectional footprint so that the multiple fibers can be easily and smoothly pushed through a duct.

SUMMARY

According to various aspects of the disclosure, an optical fiber connector sub-assembly for an optical fiber connector includes a ferrule configured to hold an optical fiber therein along an axis of the connector, a ferrule basket configured to hold the ferrule at a front portion of the connector, a retaining member having a front end portion configured to hold the ferrule holder and a rear end portion configured to receive a fiber optic cable, and a boot configured to be coupled with retaining member. The ferrule basket includes a base portion and a stem portion that extend rearward from the base portion. An outer periphery of the base portion includes two flat portions arranged at a right angle relative to one another, and first ends of the two flat portions that are nearest to one another along the outer periphery of the base portion are connected to one another by a curved bottom portion. Two side curved portions extend from second ends of the two flat portions that are furthest from one another along the outer periphery of the base portion, and top curved portion connects the two side curved portions.

According to various aspects, an LC connector includes the aforementioned optical fiber connector sub-assembly and an outer housing configured to be coupled with the optical fiber connector sub-assembly. The outer housing is configured to provide LC-style push/pull engagement/disengagement with a mating optical fiber socket.

In accordance with some aspects, a multi-fiber drop cable includes a plurality of fibers terminated with the aforementioned optical fiber connector sub-assembly.

BRIEF DESCRIPTION OF THE DRAWINGS

The invention will now be further described, by way of example only, and with reference to the accompanying drawings, in which:

FIGS. 17A-17F illustrate steps for assembling LC connectors on each of the LC connector sub-assemblies.

DETAILED DESCRIPTION OF EMBODIMENTS

A variety of optical fiber connectors are available, but SC and LC optical fiber connectors are the most common types of connectors on the market. The example given below relates to a dual LC optical fiber connector that is composed of two single LC optical fiber connectors. Such connectors have cylindrical ferrules, but the person skilled in the art will recognise that the principles of the invention described below can be applied to other types of dual optical fiber connector including those that have a non-cylindrical or stepped ferrule.

Figure 1:
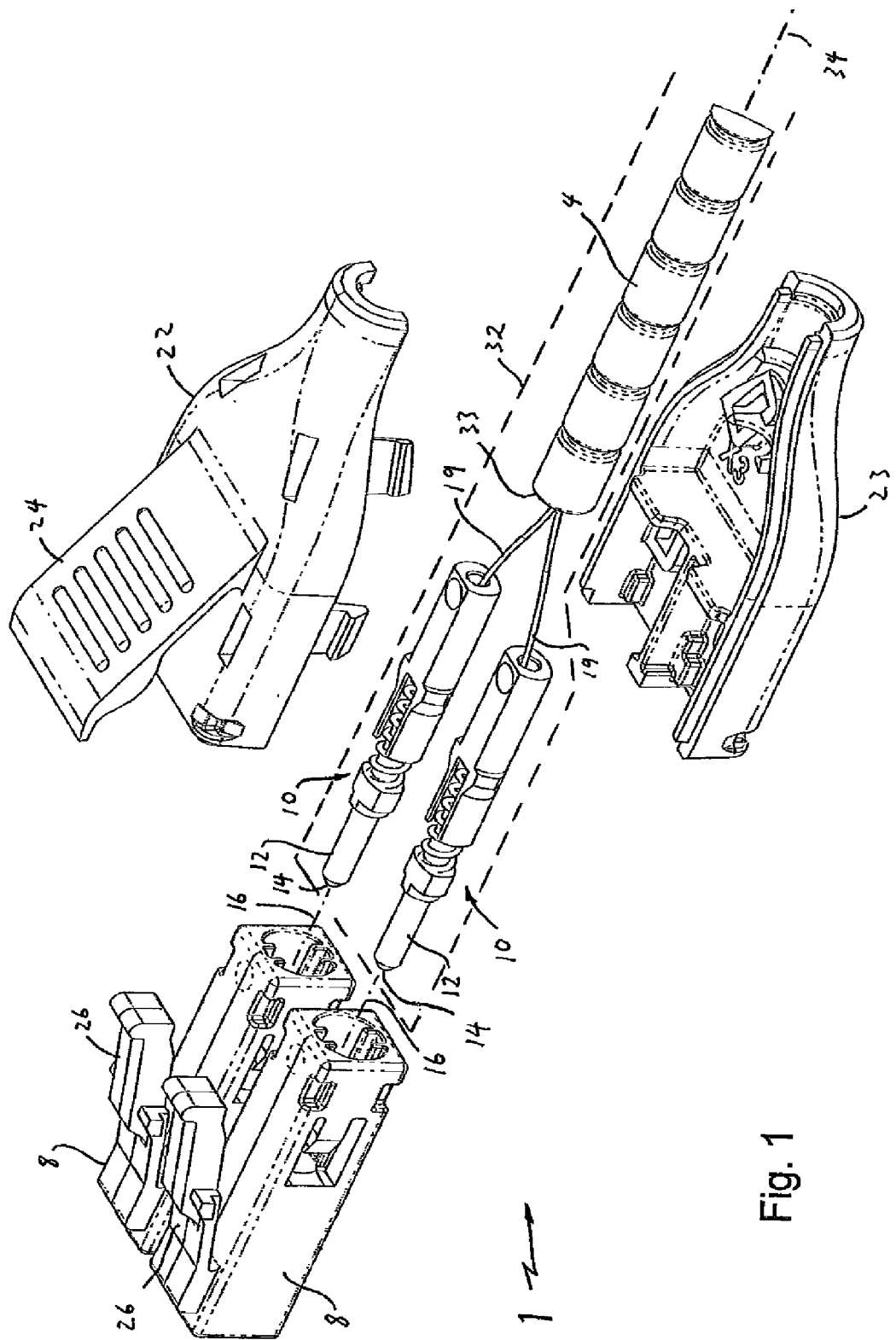
FIG. 1 is an exploded perspective view of an optical fiber duplex connector comprising a duplex optical fiber cable and a pair of optical fiber connector sub-assemblies around which is assembled an outer housing and a clamshell top and bottom cover with a quick release mechanism.
Figure 2:
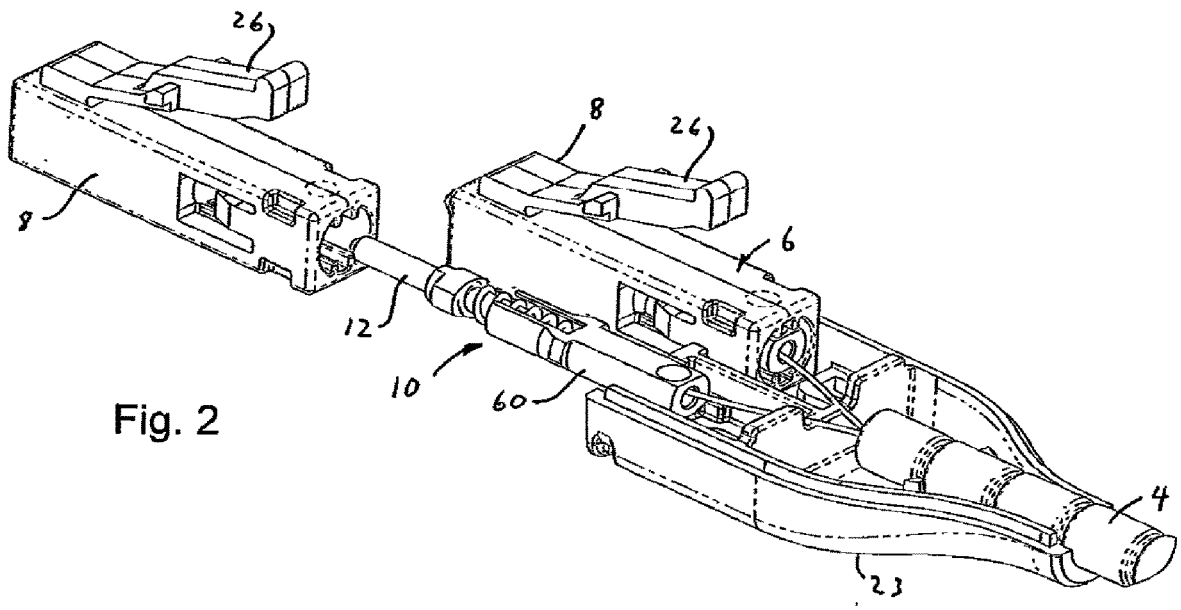
FIGS. 2 and 3 illustrate how the optical fiber duplex connector of FIG. 1 is assembled.
Figure 3:
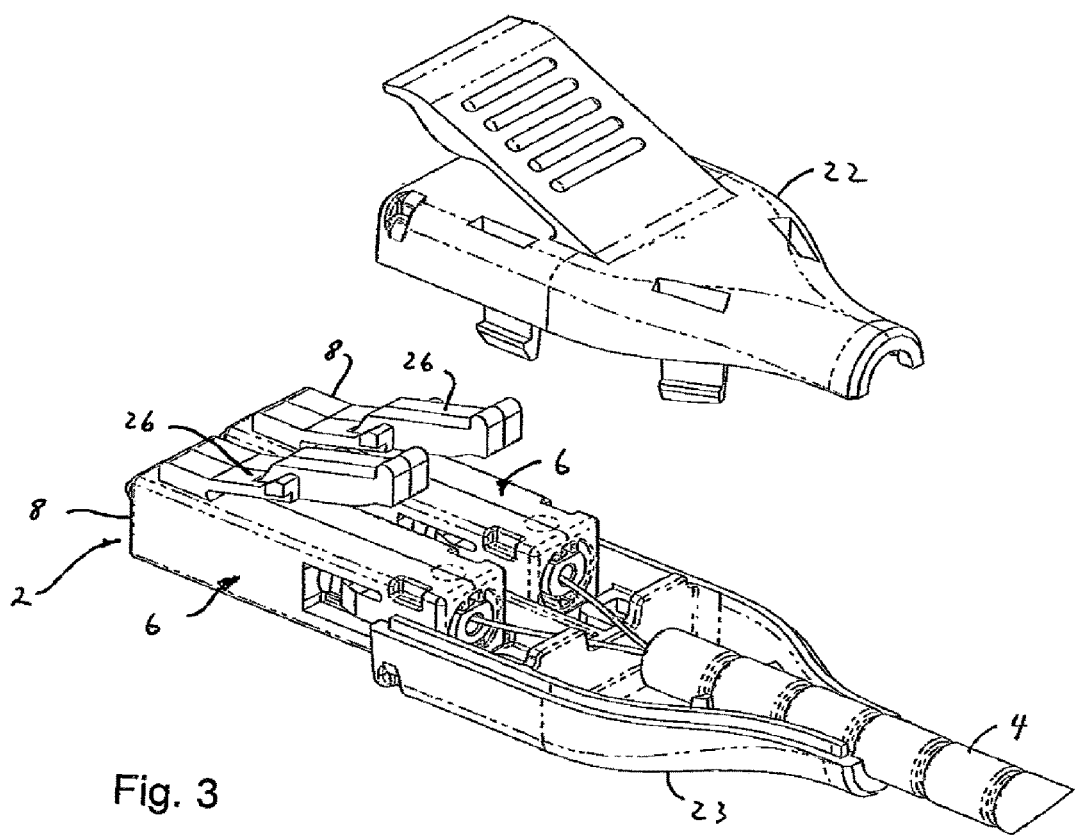
Figure 4:
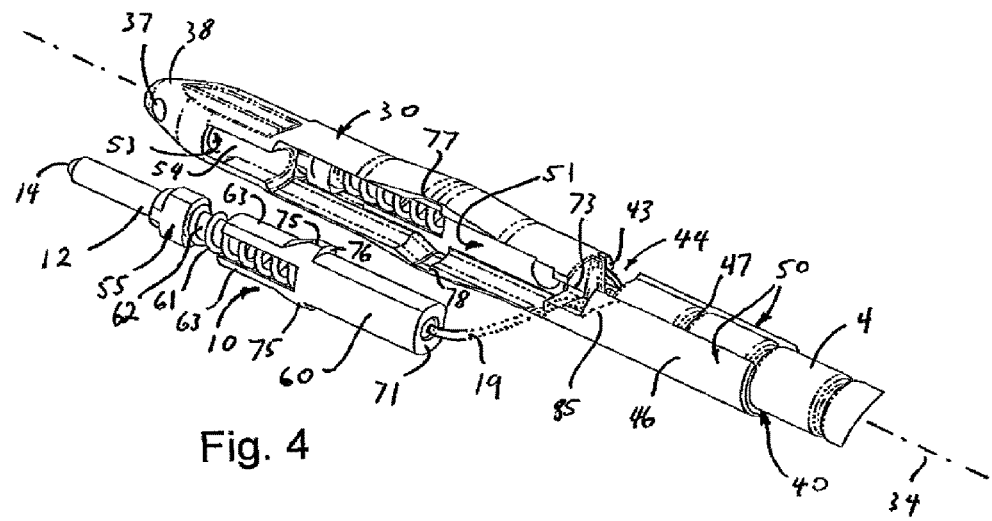
FIG. 4 is a perspective view of a protective caddy having a first receiving portion and a second receiving portion for receiving, respectively, the pair of optical fiber connector sub-assemblies and the duplex optical fiber cable

FIGS. 1 to 3 show some of the components of a prior art optical fiber duplex connector 1 and also indicate how these components are put together to form the connector 1. The connector 1 comprises a dual LC optical fiber connector 2 at the end of a duplex optical fiber cable 4. The dual connector 2 has a pair of identical LC optical fiber connectors 6 side-by-side. Each LC connector 6 has an outer housing 8 into which is seated an optical fiber connector sub-assembly 10. Each of the sub-assemblies 10 has an elongate cylindrical optical fiber ferrule 12 having at one end a termination end 14. In this example, the ferrule is of a ceramic material, although other materials may be used, as is known in the art.

Figure 7:
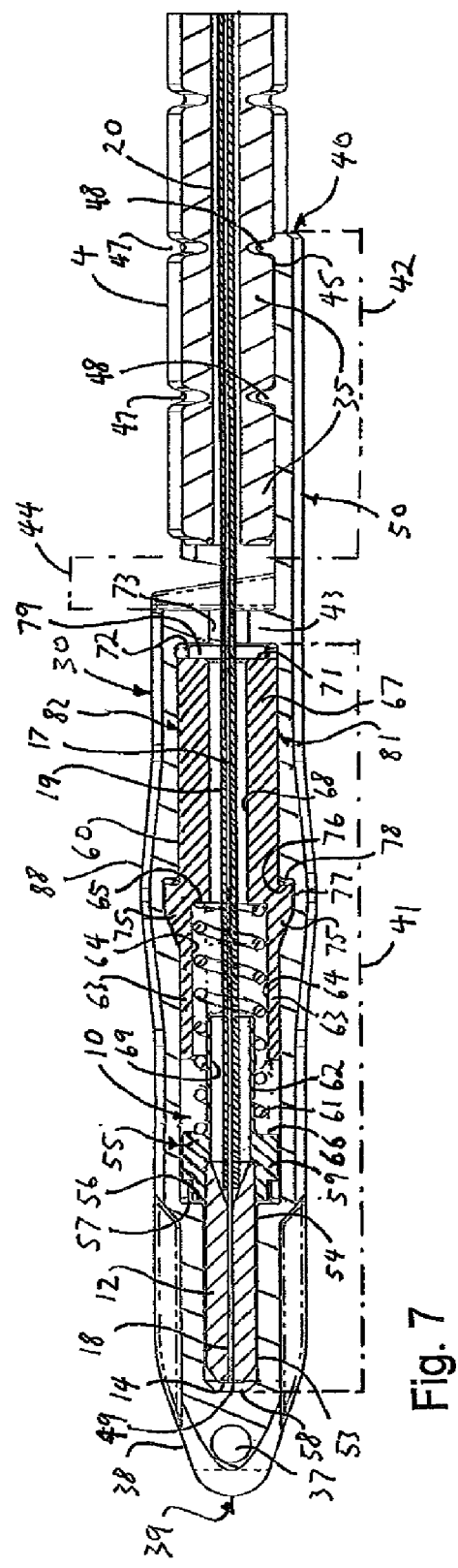
FIG. 7 is a cross section through the assembly, taken along the line VII-VII of FIG. 6.
Figure 8:
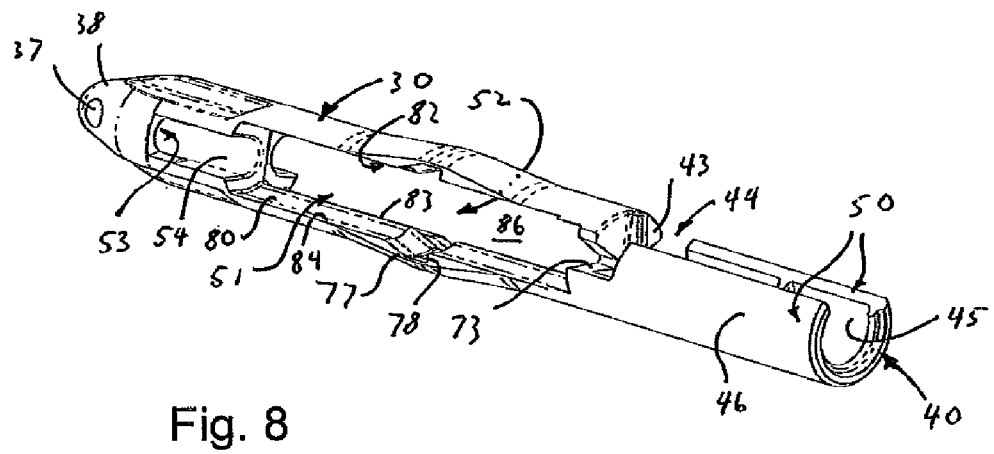
FIGS. 8 to 10 show various perspective views of the protective caddy prior to use with the optical fiber connector sub-assemblies and duplex optical fiber cable.
Figure 9:
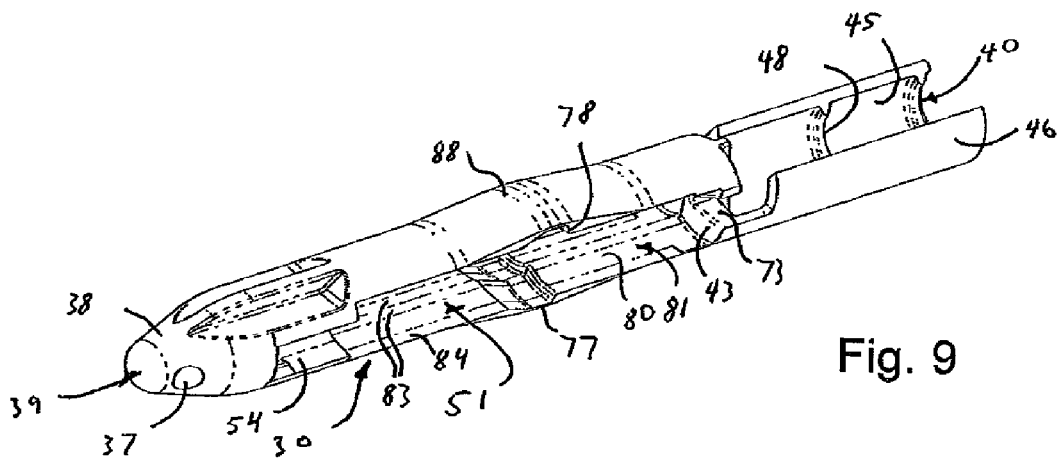

With reference now also to FIG. 7, the ferrule 12 has along its axis 16 a hollow core 18 which holds and aligns an optical fiber 17, which will most often be a single mode glass fiber. The person skilled in the art will recognise this as a conventional arrangement, in which the fiber is terminated at the ferrule termination end 14, which is polished to minimise insertion loss when the connector is joined to a matching optical fiber socket (not shown). The ferrules 12 therefore each terminate one optical fiber 17, 19 extending out from a bore 20 of the optical fiber cable 4.

The connector 2 is mechanically joined to the cable 4 by a clamshell cover having top and bottom portions 22, 23. The top portion 22 has a quick release mechanism in the form of a flexible plate 24 which when pressed by a user pushes down on a release lever 26 on each of the outer housings 8. The component of FIGS. 1 to 3 are all conventional and well-known in the art, and so will not be further described in detail.

A preferred embodiment of the invention is illustrated in FIGS. 4 to 10, which shows how a protective caddy 30 having the form of an elongate body is used to temporarily protect a duplex optical fiber cable assembly during insertion of the assembly into a length of ducting 31, which in this example is a microduct, but which may be any other type of ducting. In this example the caddy has a one-piece elongate body.

The components of a duplex optical fiber cable assembly are indicated in FIG. 1 as those inside a dashed line 32, and comprise the pair of optical fiber connector sub-assemblies 10, the portion of the optical fiber cable 4 to be inserted into the ducting 31 and the pair of optical fibers 19 each of which extends from an end 33 of the cable 4 into one of the sub-assemblies 10.

The duplex optical fiber cable assembly 32 is significantly smaller than the fully assembled connector 2 in terms of cross-sectional dimensions relative to an axis 34 that extends along the centre of the optical fiber cable 4 and along a line mid-way between the side-by-side sub-assemblies 10. Thus, the assembly 32 may be inserted into ducting with internal dimensions too small to accept the fully assembled connector 2. The components of the duplex optical fiber cable assembly 32, particularly the termination end 14 of the ferrule 12, are delicate and could not be inserted into ducting without some sort of protection. The optical fibers 19 will normally include protective polymer cladding but are also vulnerable to damage if bent more sharply than a minimum bend radius. The minimum acceptable bend radius depends on the type of optical fiber, but is of the order of 10 mm.

The optical fiber connector sub-assemblies 10 and an end-most portion 35 of the cable 4 are therefore temporarily joined to protective caddy 30 prior to insertion into the length of ducting 31. After the assembled caddy 30 and duplex optical fiber cable assembly 32 has been inserted through the ducting, for example by pulling a line or cord 36 affixed to an aperture 37 in a rounded end 38 of the caddy at a front end 39 of the caddy, and/or by jetting, and/or by pushing of the cable 4, the caddy 30 is removed from the duplex optical fiber cable assembly 32 prior to completing the assembly of the connector 1 as described above.

As indicated by dot-dashed lines in FIG. 7, the protective caddy according to the preferred embodiment of the invention has toward the first end 39 a first receiving portion 41 and towards an opposite second end 40 a second receiving portion 42. Between these ends, the first and second receiving portions have outermost surfaces that are substantially cylindrical or circular about an insertion direction, such that the caddy body 30 has an axis coincident with the cable axis 34.

The first and second receiving portions 41, 42 are adjacent one another along the axis 34, being separated by a wall 43 at a rear end of the first portion and by a clearance gap 44 at the forwards end of the second receiving portion 42. The first receiving portion is therefore proximate the first end 39 and the second receiving portion is proximate the second end 40 of the protective caddy 30.

The first and second receiving portions 41, 42 are both preferably elongate in form, having a length greater than the maximum diameter of parts of the caddy 30 having these portions. The first and second receiving portions also match the elongate shape of, respectively, the two sub-assemblies 10 and the forwards cable end portion 35 so that the two sub-assemblies can be securely held and carried by the first receiving portion 41 and so that the cable end portion 35 can be securely held and carried by the second receiving portion 42.

The second receiving portion 42 has a clip-like engagement feature for holding the duplex optical fiber cable 4, in the form of a semicircular clip or cradle 50 having substantially cylindrical inner and outer walls 45, 46. The inner wall 45 has a series of circumferentially extending ridges 48 which seat within correspondingly shaped grooves 47 in the outer wall of the cable 4. These grooves 47 are a bend-limiting feature of the cable such that the cable can be bent into an arc easily until one side of the grooves pinch together or close up, after which the force required to further bend the cable rises sharply. Such bend-limited tubing for an optical fiber cable is known in the art. In the present invention, this feature is used to secure the cable to the caddy in an axial direction, once the internal ridges 48 of the cradle are seated within the cable grooves 47.

The first receiving portion 41 has on laterally opposite sides of the 34 axis a pair of receptacles 51, 52, each for receiving one of the optical fiber connector sub-assemblies 10. The receptacles are therefore spaced radially around the axis, or in other words, spaced circumferentially around the caddy body. Each of the receptacles is a mirror image of the other, about a plane that encompasses the axis 34 of the caddy body 30.

Each receptacle 51, 52 has towards the first end 39 of the caddy body 30 a recess 53 for protectively receiving the termination end 14 of one of the optical fiber ferrules 12. In this example, each recess is within the rounded end 38 and has a cylindrical inner shape which closely matches the cylindrical outer shape of each ferrule. Each recess 53 extends in a direction parallel with, and on laterally opposite sides to, the axis 34, so that each ferrule 12 can easily slide into and out from each recess, with minimal clearance, in order to exclude as far as possible any environmental contamination from reaching the ferrule ends 14 once seated within the recesses 53. Behind each recess is a U-shaped channel 54 for accepting insertion of the ferrule 12 in a lateral direction with respect to the axis 34, and for guiding the ferrule end 14 into its recess. Each U-shaped channel is dimensioned to position and hold the ferrule once inserted. This arrangement helps to avoid any contact between the ferrule end 14 and material of the caddy body 30 during insertion and removal of the ferrule from the receptacle 51, 52.

As shown most clearly in FIG. 7, the ferrule is held by a conventional ferrule holder 55 which has on a shoulder 59 a forwards surface 56 that extends radially away from the ferrule core 18. The shoulder 56 is engaged with a ledge 57 inside each receptacle 51, 52 when the sub-assembly is seated within each receptacle. The distance in an axial direction between the ledge 57 and a base 58 of the recess 53 is greater than the corresponding distance between the ferrule holder shoulder and the ferrule termination end 14, such that a gap 49 is always provided between the termination end and recess base 58. This also helps to protect the termination end from any contact damage.

As shown most clearly in FIG. 7, the rear components of each optical fiber connector sub-assembly 10 are a ferrule holder base 60 and a coil spring 61, which together with the ferrule holder 55 form a spring-loaded ferrule carrier assembly. The ferrule holder 55 has a hollow cylindrical tubular stem 62 that extends from the shoulder 59 in a direction away from the ferrule 12, and which is concentrically seated at forwards end of the ferrule holder base 60 within a pair of forwardly projecting arms 63 which have inwardly opposed part cylindrical surfaces 64. The coil spring is seated between the stem 62 and part cylindrical surfaces 64 and is retailed in an axial direction between an annular ledge 65 in the ferrule holder base 60 at the base of the arms 63 and a rear surface 66 of the shoulder 59 of the ferrule holder 55. The ferrule holder base 60 has a tubular rear portion 67 which supports the arms 63 and which has a central bore 68 that ends from a rear end 71 of the ferrule holder base to the arms 63. The bore 68 is aligned with the space enclosed by the coil spring 61 and with a bore 69 through the ferrule holder stem 62. One of the buffered optical fibers 19 extends through these bores 68, 69, with the core 17 of the optical fiber seated within the hollow core 18 of the ferrule 12.

Each optical fiber connector sub-assembly 10 is inserted into the corresponding receptacle 51, 52 as follows. First the ferrule 12 is inserted forwards and at an angle to the axis 34 into the U-shaped channel 54 and then is slid forwards until the termination end 14 begins to enter the recess 53. At the same time, the rear part of the assembly, that is, the ferrule holder 55, ferrule holder base 60 and coil spring 61, is rotated inwards in a direction towards the axis 34 until the rear part of the assembly enters one of the receptacles 51, 52. During this process, it is necessary to partially compress the spring 61, in order to bring the ferrule holder base 60 nearer the ferrule holder 55, so that the rearmost part of the sub-assembly 10 can fit within the length of the receptacle.

The ferrule holder base 60 has a pair of tapered flanges 75 on opposite external side of the arms 63. These flanges are used in a one-way snap-fit engagement of the ferrule holder base 60 inside the outer housing 8 of the connector 6. Each of these flanges has a rearwards facing ledge 76. The body of the caddy 30 has an external bulge 88 in the region of these flanges 75 to accommodate a pair of engagement features 77 inside each receptacle 51, 52. The engagement features each have a similar shape corresponding with that of the tapered flanges, but are longer in the axial direction to allow for some axial movement of the ferrule holder base 60 with respect to the caddy 30 once the sub-assembly 10 is engaged in the corresponding receptacle 51, 52.

In order for the sub-assembly 10 to be fully inserted into the receptacle 51, 52, the spring 61 must be compressed by the right amount for each of the tapered flanges 75 to enter the corresponding engagement feature 77. The spring 61 tends to expand once this engagement is made, pushing the rear end 71 of the ferrule holder base towards a rear end surface 72 of the receptacle, while at the same time ensuring a positive contact force between the shoulder 56 of the ferrule holder 55 and the ledge 57 inside each receptacle. The rear end surface 72 of the receptacle is the forward surface of the wall 43, and before the rear end 71 of the ferrule holder base contacts this surface 72, rearwards movement of the ferrule holder base 60 is stopped by contact of the rearwards facing ledge 76 of each tapered flange 75 with a corresponding forwards ledge 78 of each engagement feature 77. This arrangement ensures a small gap 79 remains between the rear end 71 of the ferrule holder base 60 and the wall forwards surface 72, which helps to protect the optical fiber 19 from sharp changes in direction at this point and which is also useful in providing a feature of the sub-assembly to be gripped by a tool when the sub-assembly is to be removed from the receptacle.

This arrangement, in which the engagement features 77 must be aligned with the tapered flanges 75, also helps to prevent over-compression of the spring during insertion or removal of the sub-assemblies 10 from the receptacles 51, 52.

The invention therefore preferably includes an engagement feature within each receptacle to position each sub-assembly in a longitudinal orientation in which a spring-loaded ferrule carrier assembly is seated with a rearmost surface of the assembly free from contact with a supporting surface and with the termination ferrule positively engaged within its recess.

The wall 43 has a pair of slots 73, one for each receptacle 51, 52. In this example, the slots open laterally outwards in opposite directions and are V-shaped, in order to guide the buffered optical fiber 19 into the optimal alignment with the bore 68 in the ferrule holder base 60 and the bore 20 in the optical fiber cable 4.

Figure 5:
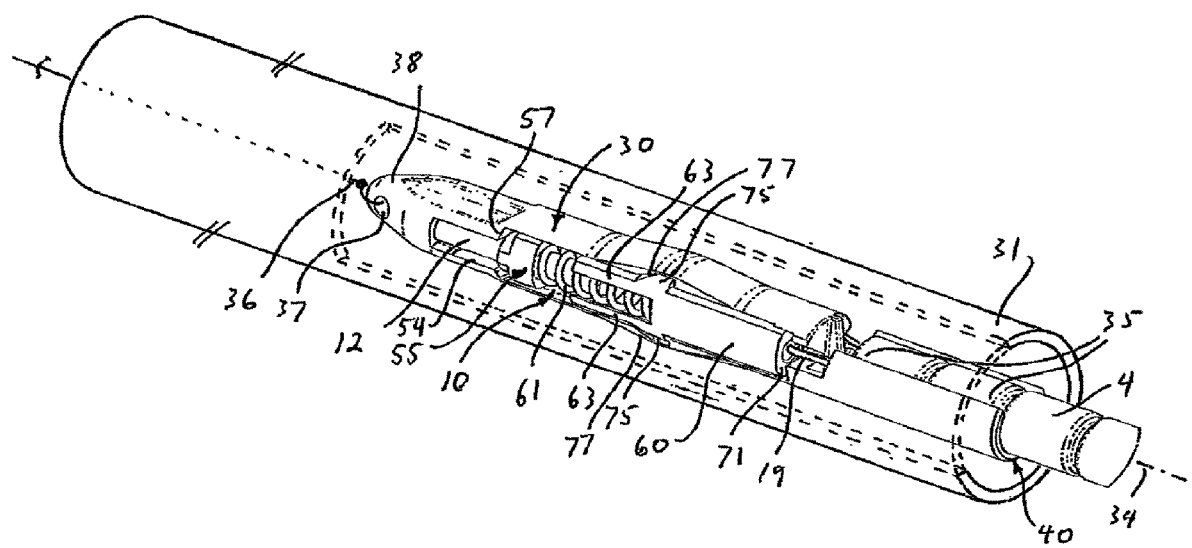
FIG. 5 shows how the protective caddy of FIG. 4 is used to protect the optical fiber connector sub-assemblies when the duplex optical fiber cable assembly is being inserted into a length of ducting.
Figure 6:
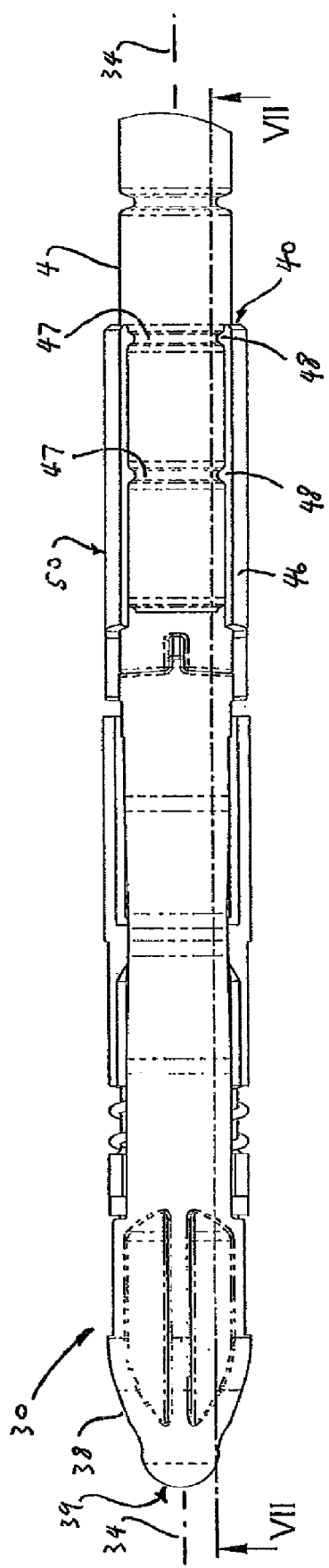
FIG. 6 shows a top view of the assembled protective caddy and optical fiber connector sub-assemblies and duplex optical fiber cable.

As can be seen most clearly from FIG. 5, the purpose of the clearance gap 44 is to provide space for the buffered optical fibers 19 to be routed between the sub-assemblies 10 and the cable 4 in an orientation and spacing similar to, but not identical with, the orientation of these components in the fully assembled connector 1. In particular, it is important that the orientation of the buffered optical fibers remains as straight as possible both during the joining of the duplex optical fiber cable assembly 32 to the caddy 30 and during the final separation of the caddy from the assembly 32 after the inserting through the ducting 31. For this reason, in order to minimise bending of the optical fiber 19, the part of the clip or cradle 50 nearest the slot 73 may, as shown by the dashed line 85 in FIG. 4, be cut away or chamfered to provide additional space for the movement of the buffered optical fiber 19.

Each receptacle 51, 52 is therefore a laterally accessible pocket in the first portion 41 of the caddy 30. Each receptacle has opposite side bands or walls 81, 82 extending from the rear surface 72 of the receptacle to the ledge 57 against which the ferrule holder 55 is seated. As shown most clearly in FIGS. 8 to 9, these side walls have a cylindrical central portion 80 running the length of the walls, either side of which is an inner lip 83 and an outer lip 84. These features of the cylindrical central portion 80 and inner and outer lips 83, 84 are continuous in a longitudinal direction, except where these are broken by the longitudinal engagement feature 77 where this extends laterally inside each recess 51, 52. Although only one wall 81 is shown fully in the drawings, the other wall 82 is a mirror image.

The inner lip 83 of each receptacle abuts the inner lip of the other receptacle along its most of its length so that there is an opening 86 between the receptacles 51, 52. The opening allows the sub-assemblies 10 to be inserted so that they are in contact, or nearly in contact, i.e. back-to-back, which minimises any wasted space in a lateral direction between the seated sub-assemblies 10. This therefore minimises the lateral extent of the caddy body 30 in this direction.

The arrangement of protective caddy described in detail above is therefore in the form of compartmentalised protective carrier or holder 30, and could be described as being a laterally segmented protective holder 30, for protecting a pair of optical fiber connector sub-assemblies of a duplex optical fiber cable.

The ferrule holder has an external dimension which just passes between the outer lips 84 with minimal clearance. The ferrule holder base 60, including tapered flanges 75, may be slightly larger than the distance between the opposed outer lips 84.

The material of the main body of the caddy 30 is preferably a plastics material, for example polypropylene, with the elongate body 30 being formed in an injection moulding process. In the preferred embodiment of the invention, the elongate body is resiliently flexible so that the ferrule holder base 60, including tapered flanges 75, can push apart the bands or walls 81, 82 in a central portion of the receptacle 51, 52 sufficiently so that the sub-assembly is received securely within the receptacle when the walls 81 relax after passage of the sub-assembly into the receptacle. The sub-assembly is then seated in the opposed longitudinal grooves.

The invention therefore preferably provides an arrangement in which the sub-assembly is temporarily secured within its receptacle in a press-fit engagement in which the receptacle resiliently deforms to accept the sub-assembly.

It should be noted that the ability of the receptacle walls to flex to allow passage of the sub-assembly into and out from each receptacle results not just from the choice of materials, but also from the presence of the opening 86 between the receptacles 51, 52 which permits the bands 81, 82 to flex. The opening therefore not only saves space, but provides a useful function in the temporary securing of the sub-assemblies 10 within the receptacle 51, 52.

The arrangement described above protects both the duplex optical fiber cable 4 and the pair of optical fiber connector sub-assemblies 10, and particularly the termination ends 14, during insertion of the protective caddy 30 and duplex optical fiber cable assembly 32 into the length of ducting 31.

As mentioned above, after the caddy 30 and duplex optical fiber cable assembly 32 have been fully inserted through the ducting 31, the protective caddy is removed from the duplex optical fiber cable assembly, after which the assembly of the optical fiber duplex connector incorporating the duplex optical fiber cable assembly is completed.

Figure 10:
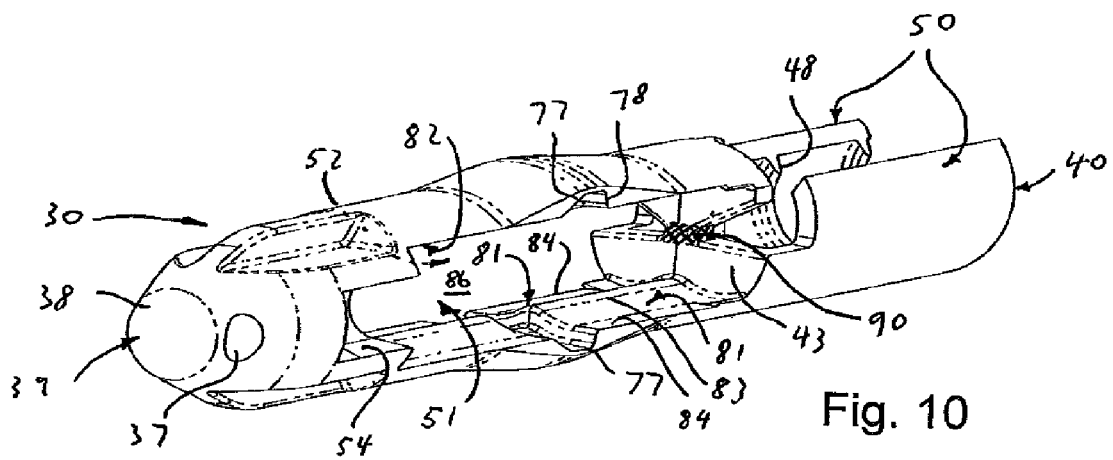

To facilitate removal of the protective caddy from the duplex optical fiber cable assembly, the caddy may, optionally, include a relatively weakened line or region adapted to be broken. FIG. 10 shows how the caddy 30 may be modified to create such a weakened line or region, by removing most of the material between the slots as indicated by cross-hatching indicated with numeral 90. A tool may then be used to prise apart of the top and bottom walls 81, 82 where these are joined by the wall 43 at the rear of the receptacles 51, 52. The top wall, which is not joined directly to the second receiving portion 42, may then be bent upwards and optionally broken off at a forwards end where this is joined to the rounded end 38, thereby allowing easy removal of the sub-assemblies 10, optical fibers 17, 19 and optical fiber cable 4 from the protective caddy 30. The invention therefore also extends to a protective caddy having a breakable elongate body 81, 90 to facilitate freeing the optical fiber connector sub-assemblies 10 from engagement with the first receiving portion 41.

The preferred embodiments described in detail above have a left/right symmetry for the receptacles, such that the cross-section through the receptacles is the same if rotated by 180° about the axis of the elongate protective caddy.

From this it can be seen that although the arrangement described above relates to a duplex optical fiber cable assembly, the principles of the invention can be applied to an optical fiber cable assembly having more than two optical fibers, each with its own optical fiber connector sub-assembly. For example, an optical fiber cable assembly having three optical fibers and three corresponding optical fiber connector sub-assemblies can be secured using a protective caddy having three receptacles, each for receiving one of the optical fiber connector sub-assemblies. These receptacles can be spaced radially around the caddy axis so that in cross-section there is a triangular symmetry to the receptacles, such that the cross-section is the same if rotated by 120° about the axis.

In the case of a protective caddy for temporarily protecting a multiple optical fiber cable assembly having four optical fibers, there would be a square symmetry to the receptacles, such that the cross-section is the same if rotated by 90° about the axis.

Although there will be a limit to number of optical fibers which can usefully be combined into a single cable or connected to a multiple optical fiber connector, the person of ordinary skill in the art will see that the protective caddy can be adapted for use with any practical number of optical fiber connector sub-assemblies.

Figure 11:
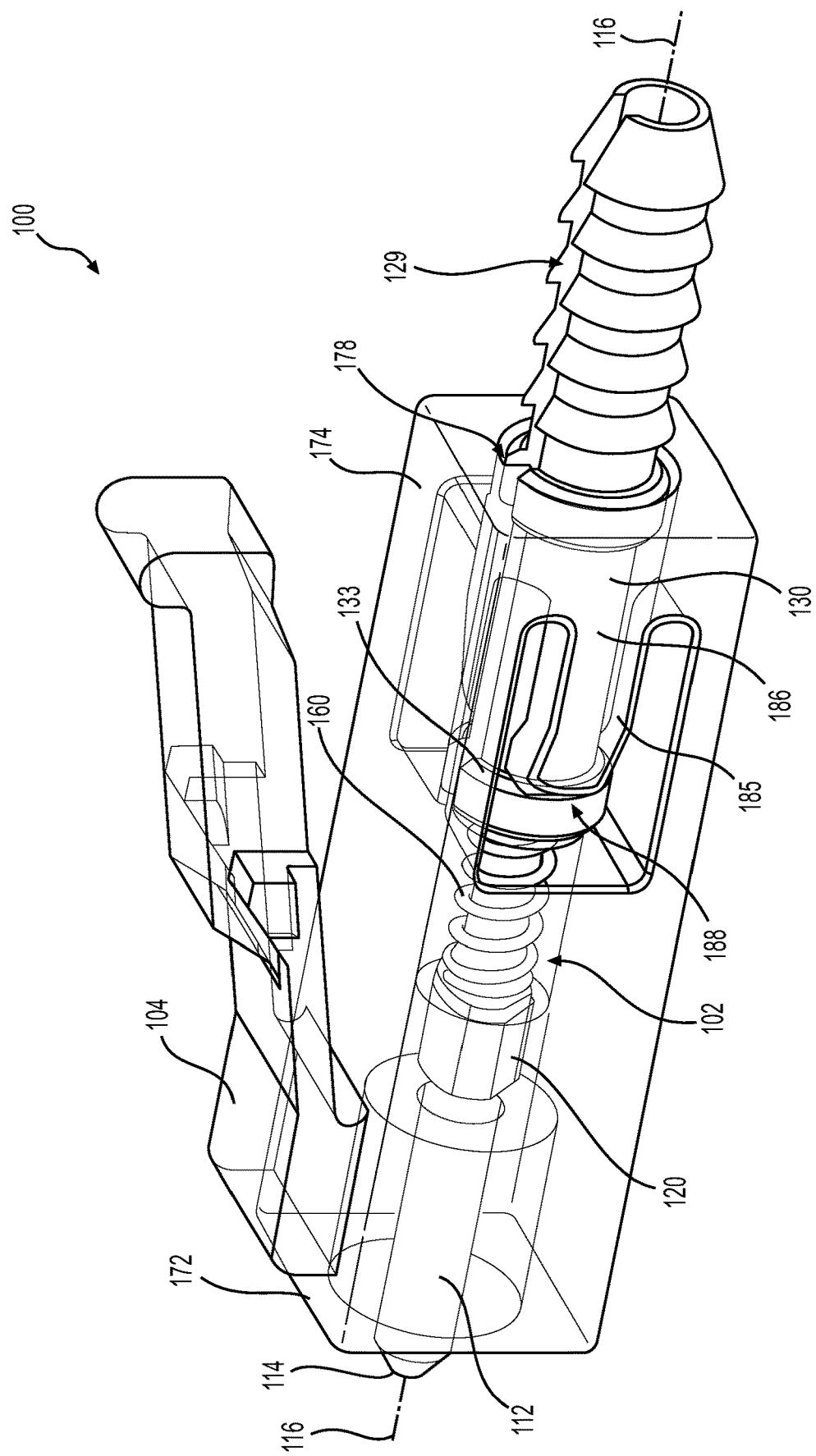
FIG. 11 is a perspective view of an exemplary LC connector in accordance with various aspects of the disclosure.
Figure 12:
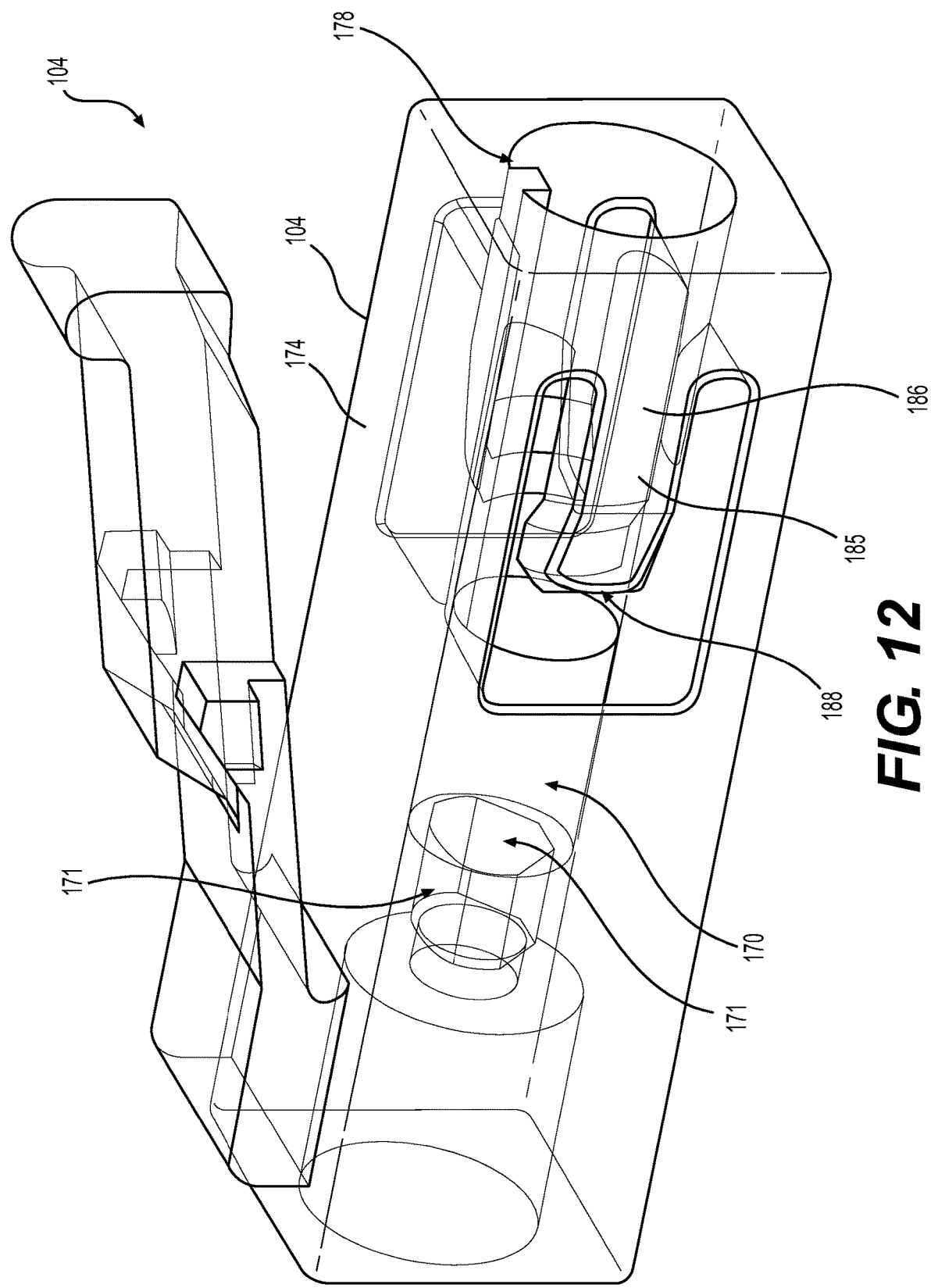
FIG. 12 is a perspective view of the outer housing of the exemplary LC connector of FIG. 11.

FIGS. 11 and 12 illustrates an exemplary LC connector 100 in accordance with various aspects of the disclosure. The LC connector 100 includes a connector sub-assembly 102 and an outer housing 104. The outer housing 104 is an LC housing configured to be received by a conventional matching LC receptacle. That is, the outer housing 104 is configured to provide LC-style push/pull engagement/disengagement with a mating optical fiber socket (not shown). The connector 100 is configured to be coupled with a fiber optic cable 106 (FIGS. 15G and 15H). For example, an end of the cable 106 is configured to be terminated with the connector sub-assembly 102.

The connector sub-assembly 102 includes an elongate cylindrical optical fiber ferrule 112 having at one end a termination end 114. In this example, the ferrule 112 is of a ceramic material, although other materials may be used, as is known in the art. The ferrule 112 has an axis 116 that extends centrally through the LC connector 100. The person skilled in the art will recognize this as a conventional arrangement, in which the fiber is terminated at the ferrule termination end 114, which is polished to minimize insertion loss when the connector is joined to a matching optical fiber socket (not shown).

The connector sub-assembly 102 also includes a ferrule basket 120, a generally cylindrical retaining member 130, and a boot 138. The ferrule basket 120 has a base portion 122 in which the ferrule 112 is seated and a cylindrical stem portion 124 that extends from the base portion 122 in an axial direction away from the ferrule 112. The base portion 122 includes an external annular shoulder 126. The base portion 122 is configured to receive the ferrule 112 in a press-fit relationship with a rear face of the ferrule abutting a forward face of an internal annular surface of the ferrule basket 120, as would be understood by persons skilled in the art. The boot 138 is configured to provide strain relief for the cable 106 and a weather resistant seal at the rearward end of the connector 100.

The retaining member 130 includes a forward end portion 132 and a rearward end portion 134. The forward end portion 132 includes an external shoulder portion 133 defining a rearward facing surface. The forward end portion 132 includes an axial bore configured to receive at least a portion of the cylindrical stem portion 124 of the ferrule basket 120. The rearward end portion 134 includes an axial bore configured to receive the fiber optic cable 106, including a sheath 107 that protects the fiber. An outer surface of the rearward end portion 134 includes one or more barbs 136 for engagement with an internal surface of the boot 138.

The connector sub-assembly 102 further includes a coil spring 160 disposed between the external annular shoulder 126 of the base portion 122 and a forward end of the retaining member 130. The coil spring 160 biases the ferrule basket 120 forwardly relative to the retaining member 130. The coil spring 160 is compressible in the axial direction by axial sliding movement of the stem portion 124 relative to the retaining member 130. The axial range of travel of the ferrule basket 120 is limited by the compressed coil spring 160. The connector 100 may further include a removable protective cap 162 having a bore configured to receive the ferrule 112.

The outer housing 104 is configured in a substantially square shape with a release lever 108 projecting outward from a top wall 174 of the outer housing 104, as is typical with conventional LC connectors. The outer housing 104 includes a through bore 170 configured to receive the connector sub-assembly 102 such that the ferrule 112 can be exposed at a front end 172 of the outer housing 104. The inner surface of the top wall 174 of the outer housing 104 includes an alignment rib 178. The alignment rib 178 is configured to be received by an axial alignment channel 129 in the top wall of the retaining member 130 and extending the length of the retaining member 130.

The outer housing 104 further includes side walls 184 having resilient fingers 185 extending inward into the through bore 170. Each of the resilient fingers 185 is cantilevered at its rear end 186, and the free forward end 188 of each finger 185 is configured to engage the retaining member 130 at a position rearward of the rearward facing surface of the external shoulder portion 133 of the forward end portion 132 of the retaining member 130 when the retaining member 130 is inserted into the outer housing 104 to couple the housing 104 with the sub-assembly 102.

Figure 13B:
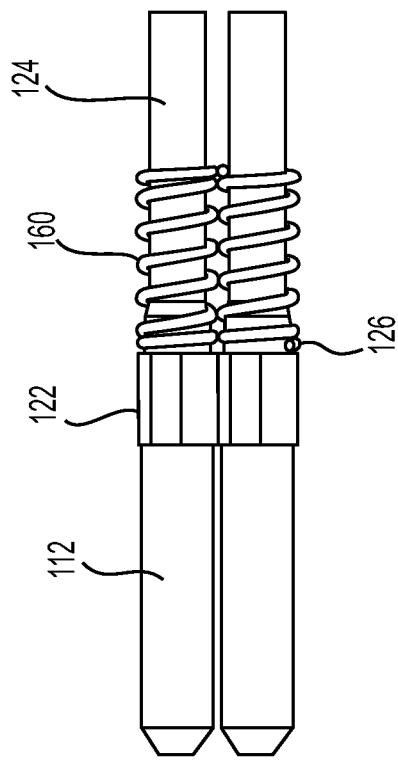
FIGS. 13A and 13B are side and front views of two LC connector sub-assemblies in accordance with various aspects of the disclosure.
Figure 14B:
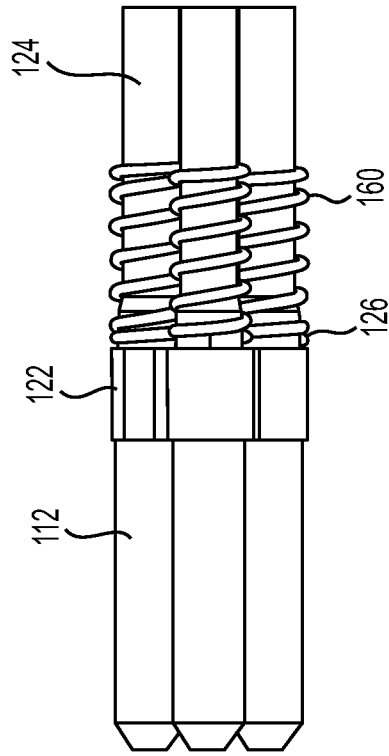
FIGS. 14A and 14B are side and front view of four LC connector sub-assemblies in accordance with various aspects of the disclosure.
Figure 13A:
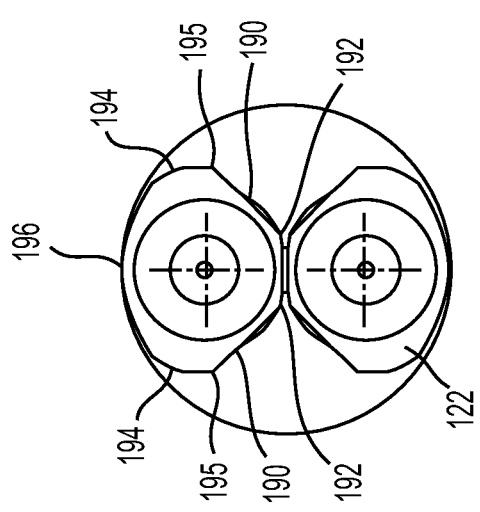
Figure 14A:
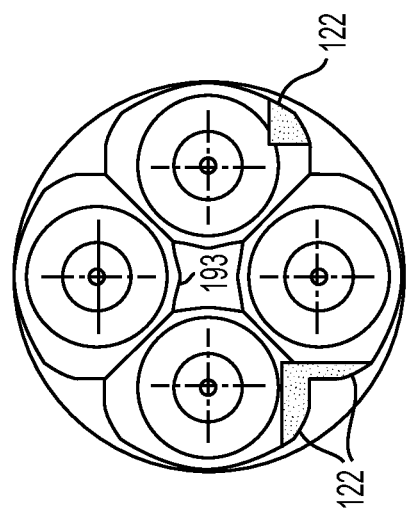

Referring now to FIGS. 13A and 14A, a cross-sectional shape of the base portion 122 of the ferrule basket 120 of the LC connector sub-assembly 102 is illustrated. As shown, an outer periphery of the base portion 122 includes two flat portions 190 arranged at a right angle relative to one another. Ends 192 of the two flat portions 190 that are nearest to one another along the periphery of the base portion are connected by a curved bottom portion 193. Two side curved portions 194 extend from the ends 195 of the two flat portions 190 that are furthest from one another along the periphery of the base portion 122. A top curved portion 196 connects the two side curved portions 194. A portion 171 of the through bore of the outer housing 104 of the LC connector 100 includes has a shape that is complementary to the aforementioned shape of the outer periphery of the base portion 122 of the ferrule basket 120 in order to provide a keyed interface between the ferrule basket 120 and the outer housing 104. The keyed interface ensures relative alignment between the ferrule basket 120 and the outer housing 104 and prevents relative rotation between the ferrule basket 120 and the outer housing 104.

As shown in FIGS. 13A and 13B, when a multi-fiber cable having two fibers terminated with LC connector sub-assemblies 102 are positioned with the bottom curved portions 193 of each of the two base portions 122 adjacent to and facing one another, the outer footprint of the cross-sectional profile of the two side-by-side base portions 122 falls within a circle having a diameter that is only slightly larger than a combined dimension of the diameters of the two ferrules 112.

Similarly, as shown in FIGS. 14A and 14B, when a multi-fiber cable having four fibers terminated with LC connector sub-assemblies 102 are positioned with the flat portions 190 of adjacent base portions 122 contacting one another and with the bottom curved portions 193 of each of the four base portions 122 facing a centerpoint between the four base portions 122, an opening is formed between the four bottom curved portions 193. However, the outer footprint of the cross-sectional profile of the four circumferentially-arranged base portions 122 falls within a circle having a diameter that is only about 25% larger than a combined dimension of the diameters of the two ferrules 112.

Figure 15B:
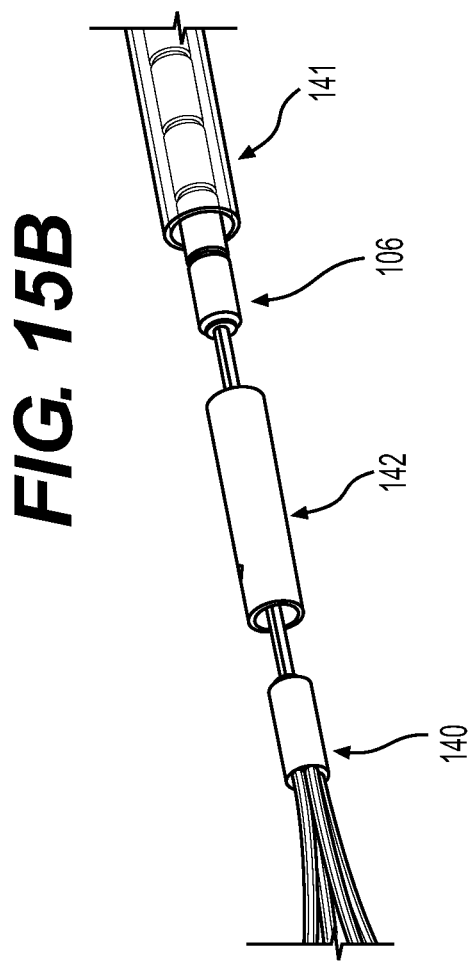
FIGS. 15A-15E illustrate steps for terminating a multi-fiber cable with LC connector sub-assemblies and deploying the fibers of the multi-fiber cable.
Figure 15A:
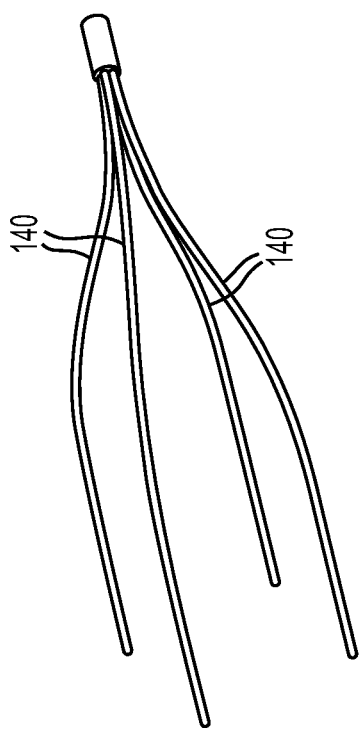
Figure 15C:
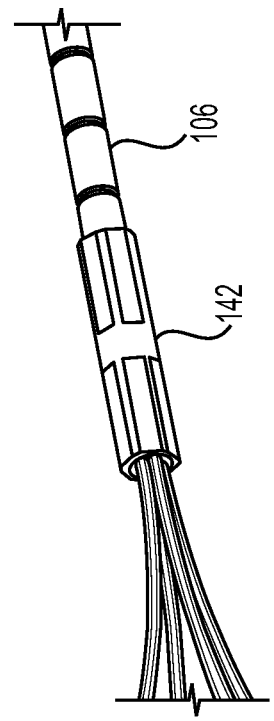
Figure 15D:
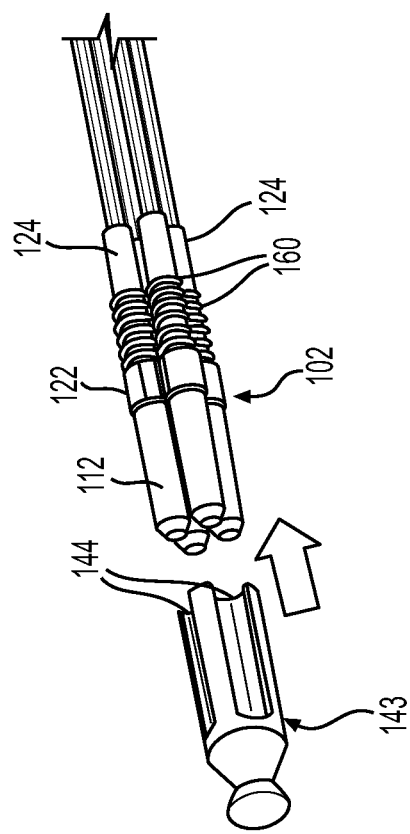
Figure 15E:
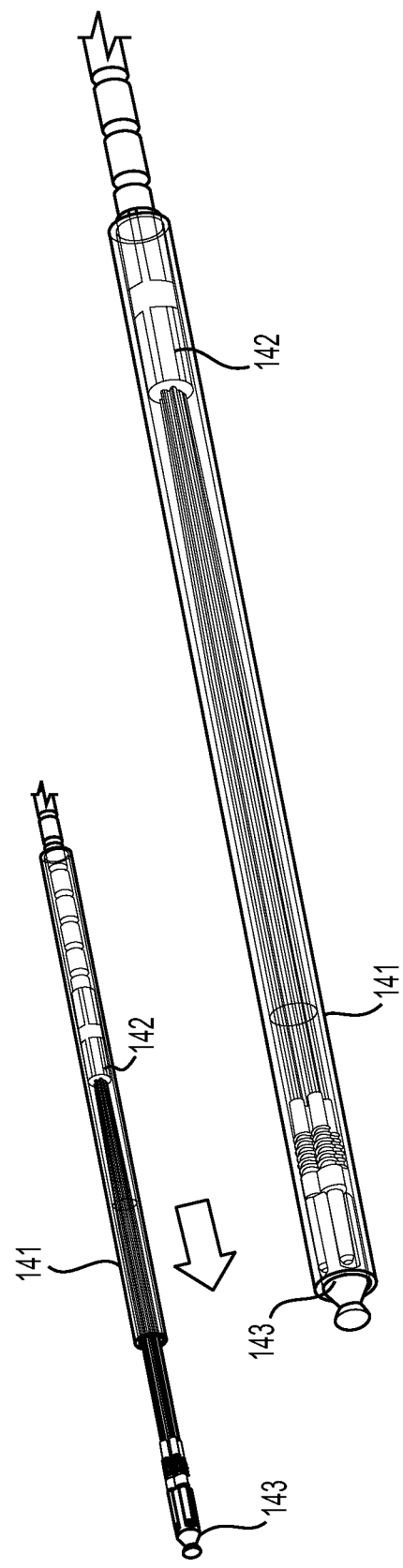
Figure 16:
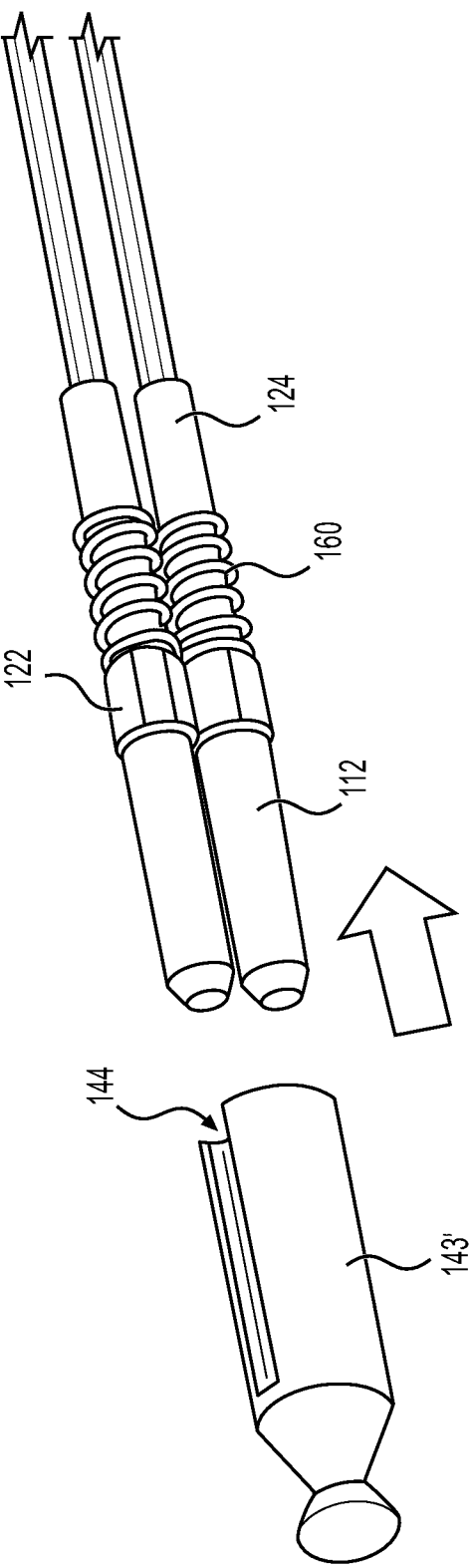
FIG. 16 illustrates an LC duo connector cap and two nestled LC connector sub-assemblies.

Referring now to FIGS. 15A-15E, termination of a multi-fiber drop cable, for example, an LC quattro drop cable is described. First, four PTFE tubes 140 are potted, as shown in FIG. 15A. Next, as shown in FIG. 15B, a protective sleeve 141 is slid over the tubes 140 and the multi-fiber cable, four fibers from the multi-fiber cable are fed through the tubes 140, and a crimp sleeve 142 is slid over the potted tubes 140. As shown in FIG. 15C, the crimp sleeve 142 is crimped into two places—onto the multi-fiber cable and onto the potted tubes. Each of the fibers is then terminated with an LC connector sub-assembly 102 and the four sub-assemblies 102 are arranged in the configuration shown in FIGS. 14A and 14B, as discussed above. As shown in FIG. 15D, a ferrule cap 143 having four channels 144 sized and arranged to receive the four LC connector sub-assemblies 102 in the nestled configuration of FIGS. 14A and 14B is attached to the sub-assemblies 102. Then, as shown in FIG. 15E, the protective sleeve 141 is slid in a forward direction over the four LC connector sub-assemblies 102 and onto the ferrule cap 143. The nestled LC connector sub-assemblies 102 can then be deployed through a duct to a desired location while be protected by the sleeve 141 and occupying a minimal cross-sectional footprint. If the multi-fiber cable includes two fibers terminated with two LC connector sub-assemblies 102, a ferrule cap 143' having two channels 144 sized and arranged to receive the two LC connector sub-assemblies 102 in the side-by-side configuration of FIGS. 13A and 13B is attached to the sub-assemblies 102.

Figure 17A:
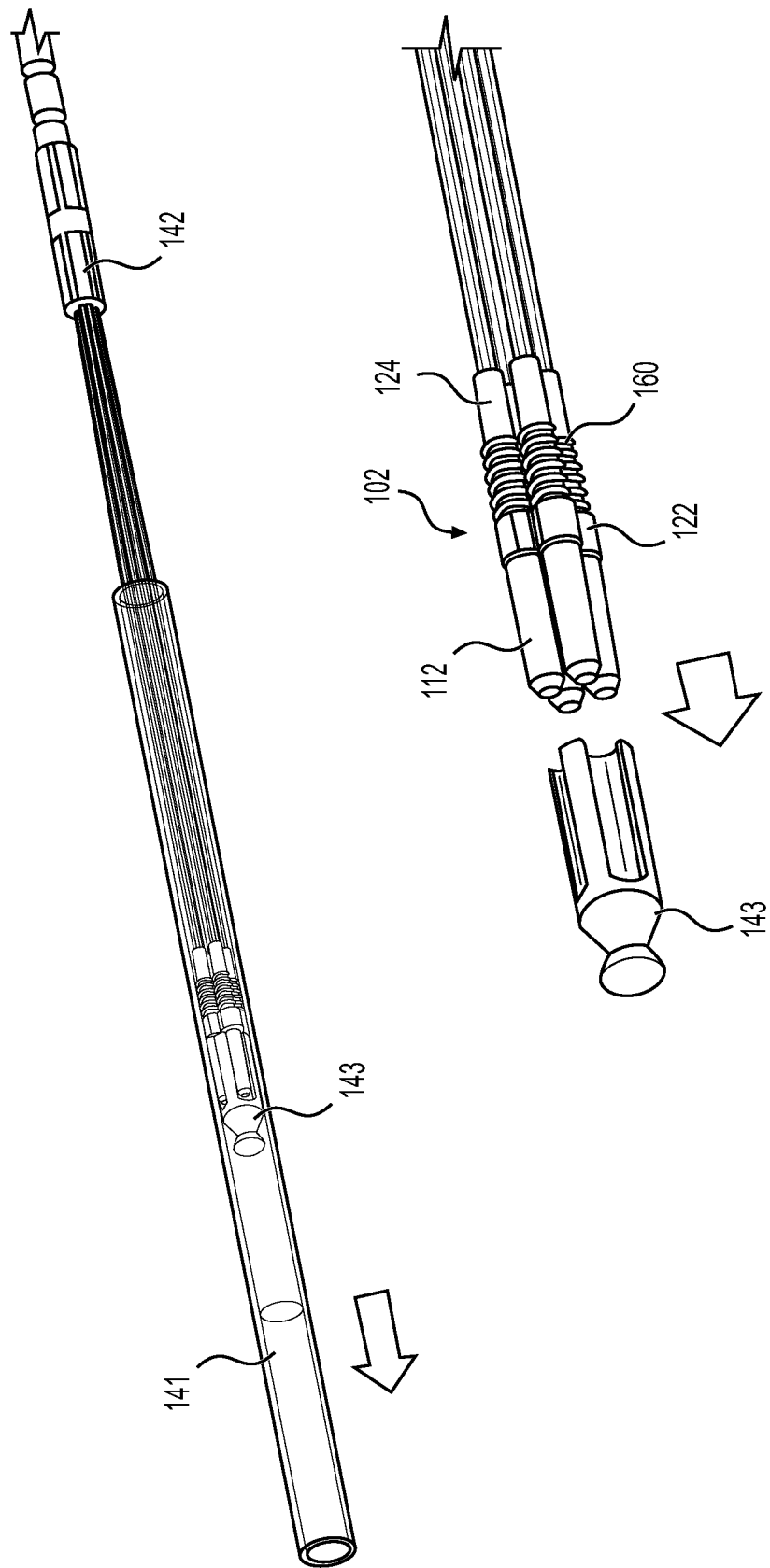
Figure 17E:
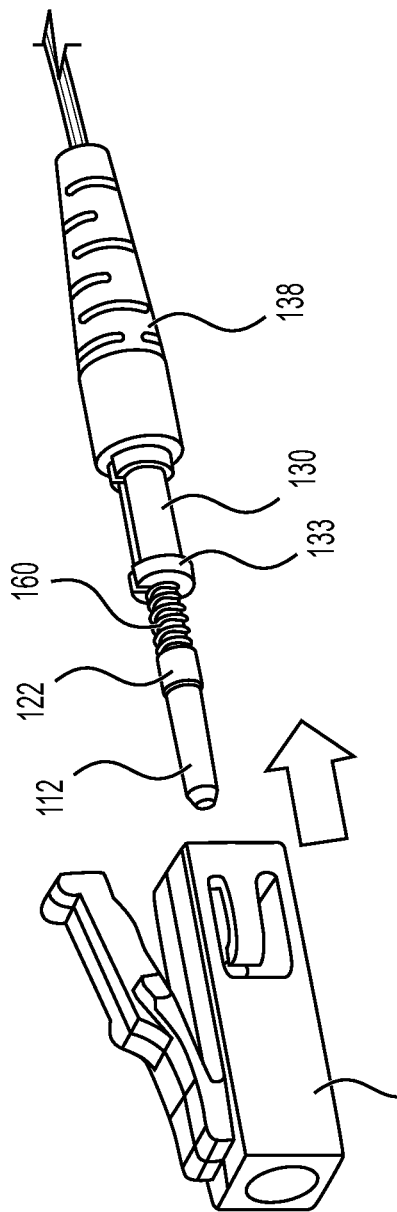
Figure 17F:
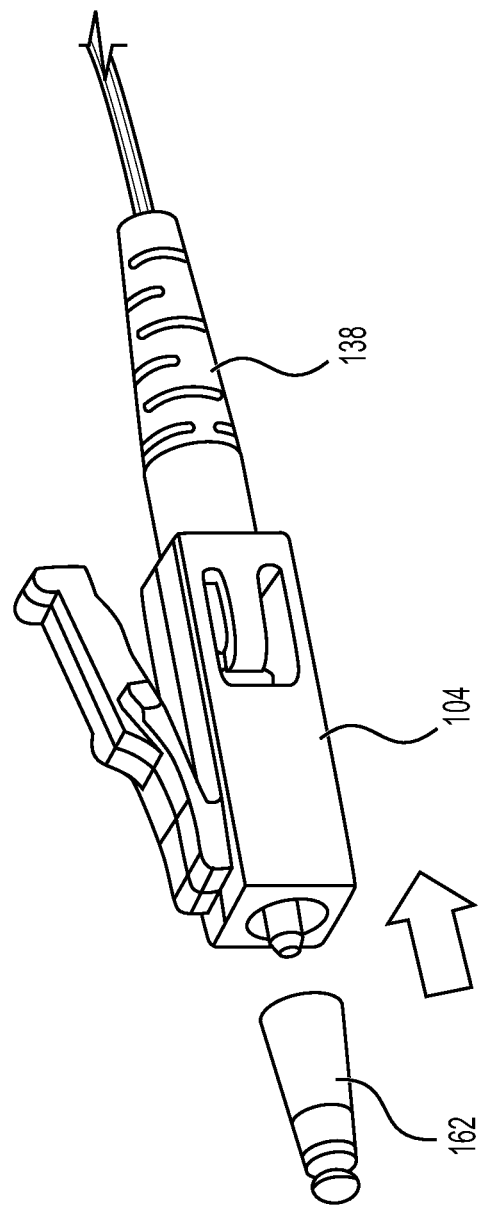

Referring now to FIGS. 17A-17F, assembly of the LC connector 100 is described. After the LC connector sub-assemblies 102 (e.g., two or four) are deployed to a desired location, the protective sleeve 141 and the ferrule cap 143, 143' are removed, as shown in FIG. 17A. The fiber optic pigtails terminated with LC connector sub-assemblies 102 are then separated, and boots 138 are slid over each of the sub-assemblies 102 such that the boot 138 is spaced rearward from a rearward end of the stem portion 124 of the ferrule basket 120, as shown in FIG. 17B. As shown in FIG. 17C, each fiber is slid through the axial alignment channel 129 in the top wall of the retaining member 130 to a position along a center axis of the retaining member 130. The boot 138 is then slid in a forward direction over a rearward end of the retaining member 130 such that the one or more barbs 136 engage the internal surface of the boot 138, as shown in FIG. 17D. As shown in FIG. 17E, the outer housing 104 is pushed onto the LC connector sub-assembly 102 until the fingers 185 engage the retaining member 130 at a position rearward of the rearward facing surface of the external shoulder portion 133 of the forward end portion 132 of the retaining member 130. The dust cap 162 may be inserted into a forward opening of the outer housing 103 to protect the ferrule 112, as shown in FIG. 17F.

It should be appreciated that although the outer housing 104 is illustrated as transparent to facilitate an understanding of the connector, the outer housing is not typically transparent.

The invention described above therefore provides a convenient apparatus and method for installing a multiple optical fiber connector when the optical fiber cable is to be routed in a duct for optical fiber cabling.

Additional embodiments include any one of the embodiments described above, where one or more of its components, functionalities or structures is interchanged with, replaced by or augmented by one or more of the components, functionalities, or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

It is to be recognized that various alterations, modifications, and/or additions may be introduced into the constructions and arrangements of parts described above without departing from the spirit or scope of the present invention, as defined by the appended claims.

What is claimed is:

1. An optical fiber connector comprising:
   an optical fiber connector sub-assembly, including:
      a ferrule configured to hold an optical fiber therein along an axis of the connector;
      a ferrule basket configured to hold the ferrule at a front portion of the connector;
      a retaining member having a front end portion configured to hold the ferrule basket and a rear end portion configured to receive a fiber optic cable;
      a boot configured to be coupled with retaining member,
      wherein the ferrule basket includes a base portion and a stem portion that extend rearward from the base portion;
      wherein an outer periphery of the base portion includes two flat portions arranged at a right angle relative to one another, first ends of the two flat portions that are nearest to one another along the outer periphery of the base portion are connected to one another by a curved bottom portion; and
      wherein two side curved portions extend from second ends of the two flat portions that are furthest from one another along the outer periphery of the base portion, and top curved portion connects the two side curved portions; and
   an outer housing configured to be coupled with the optical fiber connector sub-assembly.

2. The optical fiber connector of claim 1, wherein the outer housing is configured to provide LC-style push/pull engagement/disengagement with a mating optical fiber socket.

3. The optical fiber connector of claim 1, wherein the sub-assembly is an LC connector sub-assembly.

4. A multi-fiber drop cable comprising:
   a plurality of fibers terminated with an optical fiber connector as claimed in claim 1.

5. The multi-fiber drop cable of claim 4, wherein when the multi-fiber cable includes two fibers terminated with the connector sub-assembly and the two base portions are positioned with the bottom curved portions of each of the two base portions adjacent to and facing one another, an outer footprint of the cross-sectional profile of the two side-by-side base portions falls within a circle having a diameter that is only slightly larger than a combined dimension of the diameters of the two ferrules.

6. The multi-fiber drop cable of claim 4, wherein when the multi-fiber cable includes four fibers terminated with the connector sub-assembly and the four base portions are circumferentially arranged with the flat portions of adjacent base portions contacting one another and with the bottom curved portions of the four base portions facing a centerpoint between the four base portions, an opening is formed between the four bottom curved portions.

7. The multi-fiber drop cable of claim 6, wherein an outer footprint of a cross-sectional profile of the four circumferentially-arranged base portions falls within a circle having a diameter that is only about 25% larger than a combined dimension of the diameters of the two ferrules.

8. The optical fiber connector of claim 1, wherein the outer housing includes a through bore having a portion that has a shape that is complementary to a shape of the outer periphery of the base portion of the ferrule basket in order to provide a keyed interface between the ferrule basket and the outer housing.

9. The optical fiber connector of claim 8, wherein the keyed interface is configured to facilitate relative alignment between the ferrule basket and the outer housing, and
wherein the keyed interface prevents relative rotation between the ferrule basket and the outer housing.

10. An optical fiber connector sub-assembly for an optical fiber connector, comprising:
a ferrule configured to hold an optical fiber therein along an axis of the connector;
a ferrule basket configured to hold the ferrule at a front portion of the connector;
a retaining member having a front end portion configured to hold the ferrule basket and a rear end portion configured to receive a fiber optic cable;
a boot configured to be coupled with retaining member;
wherein the ferrule basket includes a base portion and a stem portion that extend rearward from the base portion;
wherein an outer periphery of the base portion includes two flat portions arranged at a right angle relative to one another, first ends of the two flat portions that are nearest to one another along the outer periphery of the base portion are connected to one another by a curved bottom portions; and
wherein two side curved portions extend from second ends of the two flat portions that are furthest from one another along the outer periphery of the base portion, and top curved portion connects the two side curved portions.

11. The optical fiber connector sub-assembly of claim 10, wherein the sub-assembly is an LC connector sub-assembly.

12. A multi-fiber drop cable comprising:
a plurality of fibers terminated with an optical fiber connector sub-assembly as claimed in claim 10.

13. The multi-fiber drop cable of claim 12, wherein when the multi-fiber cable includes two fibers terminated with the connector sub-assembly and the two base portions are positioned with the bottom curved portions of each of the two base portions adjacent to and facing one another, an outer footprint of the cross-sectional profile of the two side-by-side base portions falls within a circle having a diameter that is only slightly larger than a combined dimension of the diameters of the two ferrules.

14. The multi-fiber drop cable of claim 12, wherein when the multi-fiber cable includes four fibers terminated with the connector sub-assembly and the four base portions are circumferentially arranged with the flat portions of adjacent base portions contacting one another and with the bottom curved portions of the four base portions facing a center-point between the four base portions, an opening is formed between the four bottom curved portions.

15. The multi-fiber drop cable of claim 14, wherein an outer footprint of a cross-sectional profile of the four circumferentially-arranged base portions falls within a circle having a diameter that is only about 25% larger than a combined dimension of the diameters of the two ferrules.

16. An optical fiber connector comprising:
the optical fiber connector sub-assembly of claim 10; and
an outer housing configured to be coupled with the optical fiber connector sub-assembly,
wherein the outer housing is configured to provide LC-style push/pull engagement/disengagement with a mating optical fiber socket.

17. The optical fiber connector of claim 16, wherein the outer housing includes a through bore having a portion that has a shape that is complementary to a shape of the outer periphery of the base portion of the ferrule basket in order to provide a keyed interface between the ferrule basket and the outer housing.

18. The optical fiber connector of claim 17, wherein the keyed interface is configured to facilitate relative alignment between the ferrule basket and the outer housing, and
wherein the keyed interface prevents relative rotation between the ferrule basket and the outer housing.

* * * * *